July 9, 1935.  M. W. KENNEY ET AL  2,007,276
SOLUTION COMPONENT SEPARATOR
Filed March 20, 1933
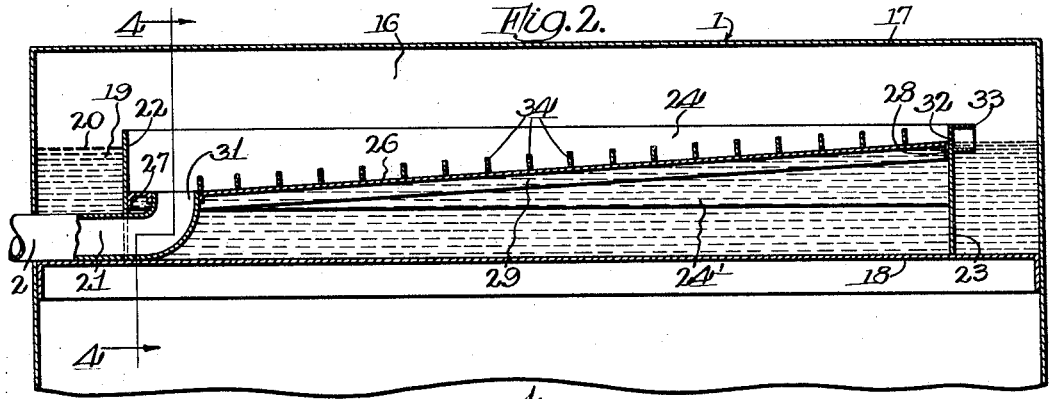
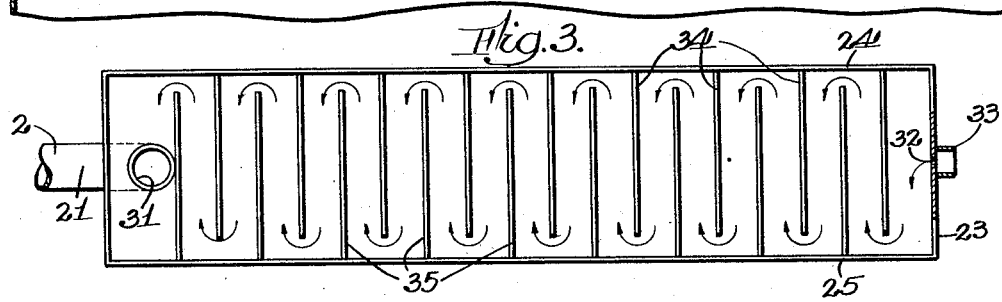
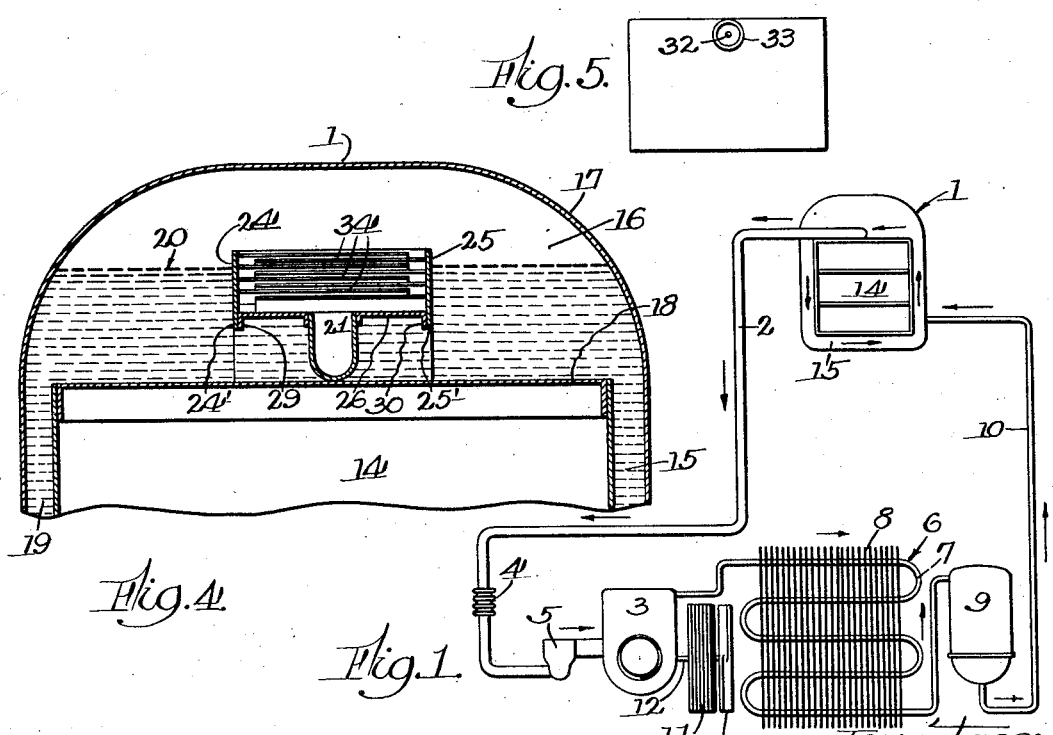
Inventors:
Mahlon W. Kenney
James D. Jordan
BY: Parkinson & Lane.  Atty.

Patented July 9, 1935

2,007,276

UNITED STATES PATENT OFFICE 2,007,276

SOLUTION COMPONENT SEPARATOR

Mahlon W. Kenney, Berwyn, and James D. Jordan, Elmhurst, Ill., assignors, by mesne assignments, to General Household Utilities Company, Chicago, Ill., a corporation of Delaware Application March 20, 1933, Serial No. 661,663

6 Claims. (Cl. 62—126)

The present invention relates to means for and process of separating components of a liquid solution, and more particularly to the separation of oil from the liquid refrigerant used in a refrigerating system.

In usual refrigeration, there is essentially an evaporation of a fluid refrigerant for the absorption of heat. The refrigerant is usually a volatile liquid contained in an evaporator, and evaporation or ebullition is effected by mechanical exhaustion or chemical absorption. The former is known as the "pressure" type of refrigeration and the latter as the "absorption" type. The present invention relates to the pressure type. In such a type, is included means for converting the vapors into liquid state for re-use in the evaporator. The converting means comprises a pump frequently referred to as a compressor and a cooling means often termed a condenser.

The refrigerant generally used is sulphur dioxide but this substance has several disadvantages. It is corrosive, poisonous, and has an obnoxious odor. In the presence of moisture or water, this substance forms an acid which attacks and corrodes the parts of the refrigerating device, causing leakage of the refrigerant and escape of its fumes. It is only slightly miscible with oil, so that the oil used in the system for lubricating purposes forms a stratum on the surface of the liquid refrigerant in the evaporator, thus reducing the evaporative effect thereof. Entry of air in the system also reduces the refrigerating efficiency of the system. When air is mixed with the vapors of some refrigerants, an explosive mixture is produced and explosions of refrigerating devices from this cause have occurred. To remove the air, it is necessary to call a service man to service the device. The same is true when water is present in the system. The purging and recharging of such a system requires considerable skill, time and effort, and is dangerous. Ammonia as a refrigerant, from a mechanical standpoint, is less desirable than sulphur dioxide. Methyl and ethyl chlorides have been used but they are poisonous, inflammable and slightly explosive, among other disadvantages, and are very undesirable.

The present invention comprehends the use of a refrigerant which avoids all of the disadvantages mentioned, and a novel device or system especially adapted for using such refrigerant. The refrigerant preferably used in connection with my invention, is dichloromethane, now obtainable in substantially pure state. It has the chemical formula $CH_2Cl_2$. It is non-inflammable, non-explosive, non-corrosive (with or without presence of moisture) of most metals used in refrigerating devices, non-poisonous and readily extinguishes fire, in both its liquid and gaseous or vaporous forms. At atmospheric pressure, it has a boiling point of about 105° F. and is therefore a liquid at all normal temperatures. Its density is about 1.33. Being a liquid, it is easily handled and can be simply poured at any point desired into the refrigerating system to charge it. It does not give off objectionable fumes. Its vapor has a very slight and inoffensive odor. The vapor has a higher specific gravity (about 3.0) than air, and sinks in air.

This refrigerant used in the present invention, is used at low pressure. This is very advantageous because it avoids any rupture in the system, and reduces leakage to a minimum. At an absolute pressure of 3.2″ Hg., its boiling point is 14° F. The pressure differential of the pump in the system used in connection with my invention, is about or less than one atmosphere, and the head pressure at the pump outlet is about atmospheric. This refrigerant has a greater thermal efficiency than any other known practical refrigerant. Its co-efficient of performance is 5.14 and is only 0.6 below the theoretical maximum. It requires less horse power per ton of refrigeration produced than any other known refrigerant. The terms "ton of refrigeration" means the amount of refrigeration effected when melting a ton of ice. Its factor is 0.918 as against the theoretical factor of 0.821. It is miscible with oil and hence no stratum of oil can be formed on the refrigerant in the evaporator to strangle or choke the evaporation of the liquid refrigerant. The refrigerant, in the system used in connection with the present invention, may contain dissolved oil to the extent of 25% and the practical operativeness of the system occurs without decreasing the efficiency of the system. Even when the content of the evaporator is half oil, the efficiency of evaporation is but slightly affected. In other words, if it were possible, but not at all probable under ordinary conditions, to dissolve sufficient oil as to constitute a large portion of the content of the system, the refrigerant still has the property of evaporating to the extent of producing a substantial exchange of heat, not materially different from the action of the refrigerant when it has practically no oil dissolved in it.

It is an object of the present invention to provide means for and a process of removing the oil from the mixture or solution of the oil and refrigerant liquid, at such a rate that the percentage of oil in the liquid in the evaporator may be maintained below a given amount.

Another object of the invention is to provide a novel means whereby a portion of the liquid in the evaporator may be made to move in a thin stream or film and subjecting such stream to such temperature and pressure as to cause an evaporating of the refrigerant liquid component but leaving the oil in liquid state, and returning such oil in such state to the body of oil in the chamber of the pump of the system.

Another object of the invention is to provide a novel process for causing a flow of a thin stream of the liquid in the evaporator in a tortuous path and subjecting such stream to such pressure and temperature as to cause the evaporation of the liquid refrigerant component and leaving the oil component in liquid state so that it may be returned to the body of oil in the casing containing the oil for the pump.

Other objects, advantages, capabilities, features, and process steps are comprehended by the invention as will later appear and as are inherently possessed by the invention.

Referring to the drawing:

Fig. 1 is a schematic view of a refrigerating system using the present invention;

Fig. 2 is a longitudinal sectional view taken through the invention and a part of the evaporator of the system;

Fig. 3 is a top plan view, with a part shown in fragmentary section, of the invention;

Fig. 4 is a transverse sectional view taken in planes represented by line 4—4 in Fig. 2 of the drawing; and Fig. 5 is an end view of the invention.

Referring more in detail to the drawing, the embodiment selected to illustrate the invention, is shown in connection with a refrigerating system comprising an evaporator 1, an exhaust duct 2 leading therefrom for conducting the vapors from the evaporator to a pump 3, the duct 2 also including a flexible duct section or segment 4 adapted to absorb and prevent transmission of vibrations from the operating parts to the other parts of the system, a check valve 5 for preventing back flow from the pump, a cooler or condenser 6 having a serpentine coil 7 carrying cooling fins 8 and leading from the discharge side of the pump and to a trap chamber 9 of sufficient size to contain the liquid refrigerant charged in the system and having (not shown) a float valve for controlling the flow of liquid refrigerant by way of duct 10 to the evaporator 1. The pump is operated by a motor 11 by way of a shaft 12 finding bearings in the casing of the pump, a fan 13 being secured to the end of the shaft and operative to cause flow of cooling air through the condenser. The showing in Fig. 1 is conventional but in practice the condenser 6 is disposed parallel to the plane of rotation of the fan 13.

The evaporator 1 embraces and surrounds the "freezing zone" compartment 14, and includes circulating passages 15, and an evaporating space 16 in the dome 17 formed at the upper part of the evaporator. A crown sheet 18 forms a bottom for the dome space. The refrigerant circulates through the system as indicated by the arrows, and also in the evaporator circuit, that is, in the passages 15 and the dome space 16, as indicated by arrows in Fig. 1. The liquid refrigerant as indicated at 19, is normally at a level as indicated at 20, in the dome space 16 of the evaporator. The pump 3 reduces the pressure in the dome space 16 and causes the liquid 19 to boil and evaporate. The vapors are drawn off or exhausted by way of the duct 2 having its inlet portion 21 extending into the dome space 16 and connected to the bottom of a receptacle forming a part of the separator and more fully described hereinafter.

The separator is in the form of an open top receptacle comprising end walls 22 and 23, side walls 24 and 25, and an inclined bottom wall or plate 26. The end walls 22 and 23 extend downwardly as legs to stand on the crown sheet 18 and to support the separator at the proper height with respect to the normal level 20 of the liquid refrigerant in the dome space 16, the space beneath the lower edges 24' and 25' of the side walls 24 and 25 and the crown sheet 18, being ample for free circulation of the refrigerant.

The inclined wall or plate 26 has flanges 27, 28, 29 and 30 respectively secured and sealed to the walls 22, 23, 24 and 25, with the flange 28 attached to the end wall 23 at a higher level than the flange 27 attached to the wall 22, so that the bottom 26 will be inclined to the horizontal at a given pitch or angle for the flow thereover of the liquid refrigerant and dissolved oil, as more fully explained later. The lower end portion of the bottom or plate 26 has an aperture in which is connected the upper end 31 of the inlet part 21 of the duct 2. The upper end of the bottom 26 is at the level 20 or even slightly above the level 20 of the liquid in the dome space 16.

Adjacent the upper end of the bottom wall 26 or slightly above it, is provided an aperture 32 in the wall 23, (see Fig. 2) for the admission of the liquid 19 into the receptacle for flowing in a thin stream or film over the surface of the wall 26. As the liquid 19 boils or undergoes ebullition, it is agitated and its level 20 rises and falls. Accordingly, some of the liquid flows through the aperture 32 and upon the plate 26. The size of the aperture may be varied in accordance with the rate of flow of liquid over the surface of the plate 26 as may be desired. Although but one aperture 32 is shown, it is to be understood that two or more such apertures may be provided in the wall 23 in proper relation with the upper end of the plate 26, or even one or more slots may be used, as desired.

In order to prevent a too rapid inflow of liquid through the opening 32, a shield or baffle 33 may be secured to the wall 23 as shown in Figs. 2, 3 and 5, that shown being in the form of a short tube surrounding the aperture 32. It will guard against the direct entry of splash, spray and the like.

If it be desired to increase the length of travel of the stream down the plate 26, means may be used to cause the stream to flow in a tortuous path, increasing the length of time of exposure of the liquid as it flows down the plate 26 and thus permitting a larger amount of flow per unit of time than would be possible by a linear flow down said plate. Therefore, on the plate 26 are provided a series of baffles or barriers 34 and 35 extending from the side walls 24 and 25 in alternate arrangement and so arranged in staggered relation that the liquid will flow in a tortuous or zigzag path more or less as indicated by the arrows shown in Fig. 3 of the drawing.

In the operation of the refrigerating system, oil is used in the pump for lubrication and the like. Some of the oil is carried over with the vapors of the refrigerant and becomes dissolved in the liquid refrigerant used in the system. As the liquid reaches the evaporator, and the refrigerant component is evaporated, the oil component remains and the percentage of the oil in the liquid in the evaporator increases. The purpose of the present invention is to remove the oil at such a rate that the percentage of oil in the liquid in the evaporator may be maintained below a given amount. We have found that by our invention we are able to keep this percentage below 1%.

As the liquid in the dome space 16 is boiled or caused to undergo an ebullition, some of the liquid flows in through the aperture 32 and down the plate 26 in a thin stream or film and in a tortuous path, and since the receptacle is open to the space in the dome, this stream is subjected to the sub-atmospheric pressure in the dome. Accordingly, the refrigerant component of the stream, evaporates and the oil component is left in liquid state so that by the time the stream reaches the outlet 31, only oil flows as a liquid into the duct part 21 and duct 2. The vapors given off from the stream flowing down the plate 26 and from the liquid 19 are drawn into the duct part 21 and duct 2. The oil reaching the pump 3, returns to the oil body in the chamber enclosing the pump. In this way, the oil content in the liquid 19 in the evaporator, is maintained much below the amount as would affect the evaporative efficiency of the refrigerant component. The action is automatic and without any movable mechanical parts.

While we have herein described and upon the drawing shown an illustrative embodiment of the invention, it is to be understood that the latter is not limited thereto but may comprehend other constructions, details, arrangements of parts, features, and process steps without departing from the spirit of the invention.

Having thus disclosed the invention,

We claim:

1. In a refrigerating system having means for evaporating a liquid refrigerant under sub-atmospheric pressures and at sub-normal temperatures, an oil separating device so associated with said evaporating means as to present an inclined surface for the flow thereover of a portion of said liquid refrigerant containing oil as a component thereof while being subjected to said pressures and temperatures for evaporation of the liquid refrigerant component and leaving the oil in liquid state, means on said inclined surface for causing the liquid to flow in a tortuous path thereover, and means for conducting the oil so left to the exhaust of the evaporating means.

2. In a refrigerating system having means for evaporating a liquid refrigerant under sub-atmospheric pressures and at sub-normal temperatures, an oil separating device so associated with said evaporating means as to present an inclined surface for the flow thereover of a portion of said liquid refrigerant containing oil as a component thereof while being subjected to said pressures and temperatures for evaporation of the liquid refrigerant component and leaving the oil in liquid state, staggered barriers on said inclined surface for causing the liquid to flow in a tortuous path over said surface, and means for conducting the oil so left to the exhaust of the evaporating means.

3. In a refrigerating system having an evaporator in which liquid refrigerant may boil under sub-atmospheric pressures and at sub-normal temperatures, said refrigerant containing oil in solution, an oil separating device therein and comprising a receptacle extending above the normal level of the liquid in said evaporator and having an inclined bottom located below said level, said receptacle having an opening slightly below said level for admitting said liquid for flowing over said inclined bottom, and an exhaust duct connected to the lower portion of said receptacle, the liquid flowing on said inclined bottom being subjected to the pressure and temperature in said evaporator for evaporating the refrigerant component of said liquid and leaving the oil in liquid state to flow to said duct.

4. In a refrigerating system having an evaporator in which liquid refrigerant may boil under sub-atmospheric pressures and at sub-normal temperatures, an oil separating device therein and comprising a receptacle extending above the normal level of the liquid in said evaporator and having an inclined bottom located below said level, said receptacle having an opening slightly below said level for admitting said liquid for flowing over said inclined bottom, and an exhaust duct connected to the lower portion of said receptacle, means on said inclined bottom to cause the liquid flowing thereover to take a tortuous path, said liquid being subjected to the pressure and temperature in said evaporator for evaporating the refrigerant component of said liquid and leaving the oil in liquid state to flow to said duct.

5. In a refrigerating system having an evaporator in which liquid refrigerant may boil under sub-atmospheric pressures and at sub-normal temperatures, an oil separating device therein and comprising a receptacle extending above the normal level of the liquid in said evaporator and having an inclined bottom located below said level, said receptacle having an opening slightly below said level for admitting said liquid for flowing over said inclined bottom, and an exhaust duct connected to the lower portion of said receptacle, staggered barriers arranged in spaced relation along said inclined bottom to cause the liquid to flow in a tortuous and elongated path over said bottom, said liquid being subjected to the pressure and temperature in said evaporator for evaporating the refrigerant component of said liquid and leaving the oil in liquid state to flow to said duct.

6. In a refrigerating system, an evaporator containing a solution of oil and refrigerant, an oil separating device in said evaporator, the sides and ends of said device extending above the normal liquid level of said solution, said device having an inclined wall extending from the normal liquid level of the solution to a point substantially below said level, an exhaust for said evaporator and located below and communicating with the lower end of said wall, and means for admitting a portion of said solution to said device whereby said portion may flow over the surface of said wall.

MAHLON W. KENNEY.
JAMES D. JORDAN.